United States Patent
Nakamura et al.

(10) Patent No.: US 11,359,730 B2
(45) Date of Patent: Jun. 14, 2022

(54) VALVE DEVICE

(71) Applicant: FUJIKIN INCORPORATED, Osaka (JP)

(72) Inventors: Nobuo Nakamura, Osaka (JP); Kenta Kondo, Osaka (JP); Tomohiro Nakata, Osaka (JP); Masahiko Nakazawa, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 17/212,406

(22) Filed: Mar. 25, 2021

(65) Prior Publication Data

US 2021/0207722 A1     Jul. 8, 2021

Related U.S. Application Data

(63) Continuation of application No. PCT/JP2019/035457, filed on Sep. 10, 2019.

(30) Foreign Application Priority Data

Sep. 25, 2018   (JP) .............................. JP2018-179314

(51) Int. Cl.
*F16K 7/16*     (2006.01)
*F16K 27/02*    (2006.01)

(52) U.S. Cl.
CPC ............ *F16K 7/16* (2013.01); *F16K 27/0236* (2013.01)

(58) Field of Classification Search
CPC ... F16K 1/50; F16K 7/116; F16K 7/20; F16K 27/0236; F16K 31/504; F16K 41/106; F16K 41/125
See application file for complete search history.

(56) References Cited

U.S. PATENT DOCUMENTS 5,516,078 A * 5/1996 Wellener, III .......... F16K 1/302
                                                       251/266
5,669,596 A    9/1997 Yoshikawa et al.
(Continued)

FOREIGN PATENT DOCUMENTS

| JP | S3821820 Y1 | 10/1963 |
|----|-------------|---------|
| JP | H08219303 A | 8/1996  |
| JP | 2006162043 A | 6/2006 |

OTHER PUBLICATIONS

International Search Report for International Application PCT/JP2019/035457; dated Nov. 26, 2019.

*Primary Examiner* — Hailey K. Do
(74) *Attorney, Agent, or Firm* — Cantor Colburn LLP

(57) ABSTRACT

A valve device includes: a valve device body including a valve seat; a diaphragm that is provided to cover a valve chamber; a stem; and a valve body portion that is inserted into a central portion of the diaphragm, and that is configured to open and close the fluid passage by approaching the valve seat and separating from the valve seat. The diaphragm includes a main diaphragm, and a support diaphragm positioned on an opposite side of the main diaphragm to the valve chamber side and provided in contact with the main diaphragm. A first terminal end portion on an inner peripheral side of the main diaphragm is fixed to the valve body portion. A second terminal end portion on an inner peripheral side of the support diaphragm is separated from the first terminal end portion on the inner peripheral side of the main diaphragm.

2 Claims, 2 Drawing Sheets

(56) References Cited

U.S. PATENT DOCUMENTS

| | | | | |
|---|---|---|---|---|
| 5,725,007 A * | 3/1998 | Stubbs | .................... | F16K 41/12 |
| | | | | 137/15.18 |
| 5,743,513 A * | 4/1998 | Yoshikawa | ............. | F16K 41/12 |
| | | | | 251/335.2 |
| 7,628,376 B2 | 12/2009 | Masamura et al. | | |
| 2006/0289825 A1 * | 12/2006 | Wincek | ................... | F16K 7/126 |
| | | | | 251/331 |

* cited by examiner

// VALVE DEVICE

CROSS REFERENCE TO RELATED APPLICATION

This application is a continuation under 35 U.S.C. § 120 of PCT/JP2019/035457, filed Sep. 10, 2019, which is incorporated herein reference and which claimed priority to Japanese Application No. 2018-179314, filed Sep. 25, 2018. The present application likewise claims priority under 35 U.S.C. § 119 to Japanese Application No. 2018-179314, filed Sep. 25, 2018, the entire content of which is also incorporated herein by reference.

TECHNICAL FIELD

The present disclosure relates to a valve device.

BACKGROUND

A valve device in which a valve chamber of a valve device body is covered by a diaphragm and the valve device is opened and closed by operating the diaphragm is available in the prior art (see Japanese Patent Application Publication No. 2006-162043, for example).

SUMMARY

In this conventional valve device, however, sufficient measures have not been taken against deformation of the diaphragm and pressure exerted on the diaphragm by high-pressure fluid, and therefore, when greater durability than that of a conventional valve device is required, a conventional valve device is lacking.

Hence, one of the objects of the present disclosure is to provide a valve device exhibiting superior durability.

It is therefore an object of the present disclosure to provide a valve device includes a valve device body, a diaphragm, a stem, and a valve body portion. The valve device body has a fluid passage and a valve chamber formed therein and includes a valve seat. The diaphragm that is provided to cover the valve chamber and keeps the valve chamber airtight.

The stem that is configured to move to approach and separate from the valve seat. The valve body portion is inserted into a central portion of the diaphragm and connected to the stem, and is configured to open and close the fluid passage by approaching the valve seat and separating from the valve seat. The diaphragm includes a main diaphragm, and a support diaphragm positioned on an opposite side of the main diaphragm to the valve chamber side and provided in contact with the main diaphragm. A first terminal end portion on an inner peripheral side of the main diaphragm is fixed to the valve body portion. A second terminal end portion on an inner peripheral side of the support diaphragm is separated from the first terminal end portion on the inner peripheral side of the main diaphragm.

DETAILED DESCRIPTION

A valve device 1 according to a first embodiment of the present disclosure will be described with reference to the drawings.

Figure 1:
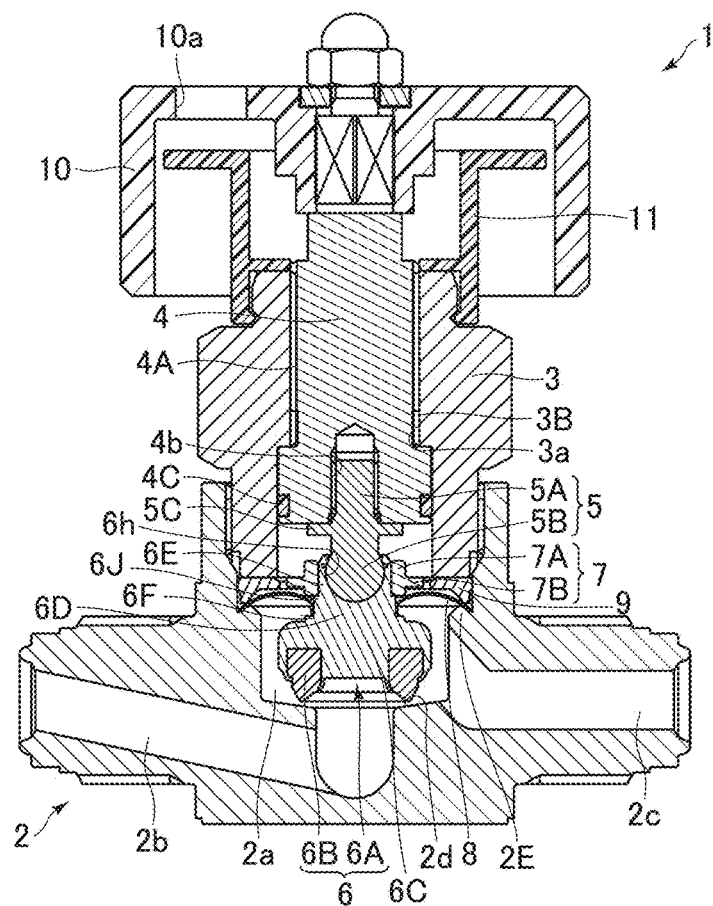
FIG. 1 illustrates a longitudinal cross-sectional view of a valve device in an open state according to a first embodiment.
Figure 2:
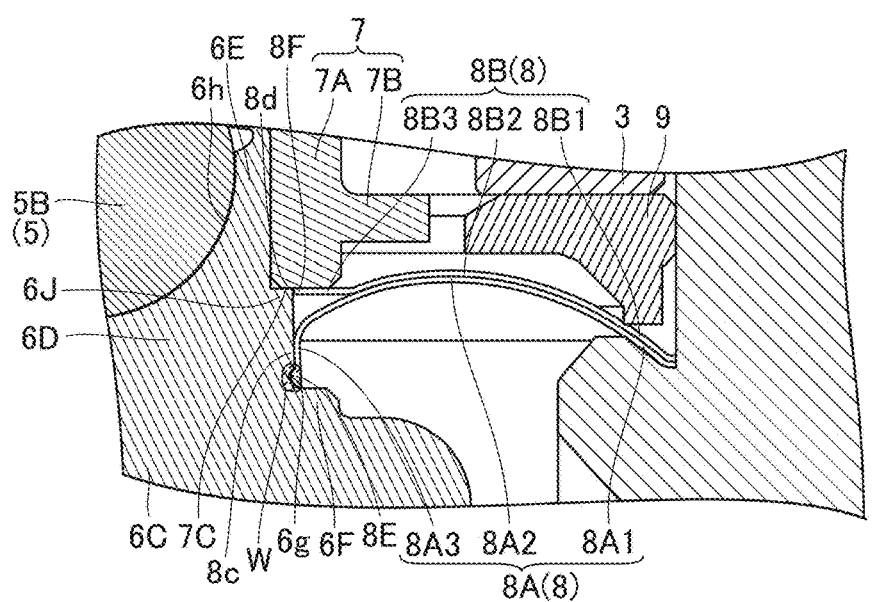
FIG. 2 illustrates an enlarged cross-sectional view of the vicinity of a diaphragm of the valve device according to the first embodiment.

FIG. 1 illustrates a longitudinal cross-sectional view of the valve device 1 according to the first embodiment in an open state. FIG. 2 illustrates an enlarged cross-sectional view of the vicinity of a diaphragm 8 of the valve device 1.

As illustrated in FIG. 1, the valve device 1 includes a valve device body 2, a bonnet 3, a stem 4, a connecting member 5, a valve body portion 6, a retaining ring 7, the diaphragm 8, a retaining adapter 9, a handle 10, and an indicator 11. Note that in the following description, the handle 10 side of the valve device 1 will be described as an upper side, and the valve device body 2 side will be described as a lower side.

A valve chamber 2a, and an inflow passage 2b and an outflow passage 2c that communicate with the valve chamber 2a are formed in the valve device body 2. A peripheral edge of a location, where the inflow passage 2b communicates with the valve chamber 2a, of the valve device body 2 forms an annular valve seat 2d.

The bonnet 3 has a substantially cylindrical shape and is fixed to the valve device body 2 so as to cover the valve chamber 2a by screwing a male screw portion provided on a lower end portion thereof into a female screw portion provided in an upper end portion of the valve device body 2. A stem insertion hole 3a is formed in the bonnet 3. Further, a female screw portion 3B is formed in an upper end portion of an inner periphery of the bonnet 3.

The stem 4 is inserted into the stem insertion hole 3a in the bonnet 3. A male screw portion 4A is formed on an upper side portion of the stem 4, and the male screw portion 4A is screwed into the female screw portion 3B in the bonnet 3. Thus, the stem 4 is supported so as to be capable of rotating relative to the bonnet 3 and moving in an up-down direction while rotating. When the stem 4 is at top dead center, the valve device 1 is in an open state, and when the stem 4 is at bottom dead center, the valve device 1 is in a closed state.

A screw hole 4b that opens downward and has a female screw portion formed on an inner peripheral surface thereof is formed in a lower side portion of the stem 4. Further, an O-ring 4C is interposed between the stem 4 and the bonnet 3.

The connecting member 5 is provided on a lower end of the stem 4 and includes a columnar portion 5A and a hemispherical portion 5B. A male screw portion is formed on an outer peripheral surface of the columnar portion 5A, and the male screw portion is screwed into the screw hole 4b. As a result, the connecting member 5 is fixed to the stem 4. A first flange portion 5C that projects outward in a radial direction of the columnar portion 5A is provided on the columnar portion 5A on the lower side of the male screw portion, and the first flange portion 5C contacts a lower surface of the stem 4. The hemispherical portion 5B is formed in a substantially hemispherical shape (a shape between a hemisphere and a full sphere) and provided on a lower end of the columnar portion 5A.

The valve body portion 6 includes a valve body holder 6A and a valve body 6B. The valve body holder 6A includes a valve body holding portion 6C, a penetrating portion 6D, and a fitting portion 6E. The valve body holding portion 6C is substantially disc-shaped and holds the annular valve body 6B, which is formed from resin. A fluid passage is opened and closed by bringing the valve body 6B into contact with the valve seat 2d of the valve device body 2 and separating the valve body 6B from the valve seat 2d.

The penetrating portion 6D is provided on an upper side of the valve body support portion 6C and formed in a stepped columnar shape that tapers toward the upper side. A fixing groove 6g is formed around the entire circumference of an outer peripheral surface of a first step portion 6F of the penetrating portion 6D. The fitting portion 6E is provided on an upper side of the penetrating portion 6D and formed in a substantially cylindrical shape, and a fitting hole 6h that opens upward is formed therein. The fitting hole 6h is formed in a substantially hemispherical shape (a shape between a hemisphere and a full sphere) corresponding to the hemispherical portion 5B. The hemispherical portion 5B of the connecting member 5 is fitted into the fitting hole 6h. Thus, the valve body holder 6A and the connecting member 5 are connected so that the valve body holder 6A can slide around the outer surface of the hemispherical portion 5B. Further, the fitting portion 6E is formed to have a smaller diameter than the penetrating portion 6D so that a second step portion 6J is formed by the fitting portion 6E and the penetrating portion 6D.

The retaining ring 7 is provided on the opposite side of the diaphragm 8 to the valve chamber 2a side, and includes a cylindrical portion 7A and a second flange portion 7B. By press-fitting the fitting portion 6E of the valve body holder 6A into the cylindrical portion 7A, the retaining ring 7 is fixed to the valve body holder 6A. An inner diameter side of a lower surface 7C of the cylindrical portion 7A contacts the second step portion 6J, and an outer diameter side of the lower surface 7C of the cylindrical portion 7A is positioned further outward than the outer peripheral surface of the penetrating portion 6D. The second flange portion 7B projects outward in the radial direction of the cylindrical portion 7A from an intermediate part of the cylindrical portion 7A in the up-down direction.

The diaphragm 8 is provided to cover the valve chamber 2a of the valve device body 2, thereby keeping the valve chamber 2a airtight. The diaphragm 8 includes a main diaphragm 8A and a support diaphragm 8B.

The main diaphragm 8A is constituted by a single thin plate (thickness: 0.1 to 0.2 mm, for example) formed in a plate shape from nickel alloy or stainless steel, for example. The main diaphragm 8A directly opposes the valve chamber 2a and directly contacts a fluid such as a process gas. The main diaphragm 8A includes, in order from the outside toward the inside in the radial direction thereof, a first outer peripheral portion 8A1, a first intermediate portion 8A2, and a first inner peripheral portion 8A3.

The first outer peripheral portion 8A1, together with a second outer peripheral portion 8B1 of the support diaphragm 8B, is provided between a fixing portion 2E formed on the valve device body 2 and the annular retaining adapter 9, and by tightening the bonnet 3, the first outer peripheral portion 8A1 and second outer peripheral portion 8B1 are compressed by the retaining adapter 9 and the valve device body 2 so as to be held in an airtight state. The first intermediate portion 8A2 has an arc-shaped cross-section when cut on a plane that includes the axis thereof.

The first inner peripheral portion 8A3 is formed so as to curve downward from an inner end of the first intermediate portion 8A2. An inner peripheral surface of the first inner peripheral portion 8A3 contacts the outer peripheral surface of the penetrating portion 6D. A first penetrating hole 8c that is penetrated by the penetrating portion 6D of the valve body holder 6A is formed in a central portion of the main diaphragm 8A by an inner peripheral surface of the first inner peripheral portion 8A3. A projecting portion is provided on a first terminal end portion 8E of the first inner peripheral portion 8A3, and in a state where the projecting portion is fitted to the fixing groove 6g of the penetrating portion 6D, this part is welded W over the entire circumference thereof by electron beam welding, laser welding, or the like so that the first terminal end portion 8E of the first inner peripheral portion 8A3 is fixed to the penetrating portion 6D.

The support diaphragm 8B is provided on the upper side of the main diaphragm 8A, or in other words the opposite side to the valve chamber 2a. The support diaphragm 8B is simply placed on the main diaphragm 8A and not adhered or otherwise joined thereto. The support diaphragm 8B is constituted by a single thin plate (thickness: 0.1 to 0.2 mm, for example) formed in a plate shape from metal, rubber, resin, or the like, for example. In this embodiment, the support diaphragm 8B is formed from a different material to the material forming the main diaphragm 8A, but the support diaphragm 8B and the main diaphragm 8A may be formed from the same material. The support diaphragm 8B includes, in order from the outside toward the inside in the radial direction thereof, the second outer peripheral portion 8B1, a second intermediate portion 8B2, and a second inner peripheral portion 8B3.

As described above, the second outer peripheral portion 8B1, together with the first outer peripheral portion 8A1 of the main diaphragm 8A, is provided between the fixing portion 2E of the valve device body 2 and the annular retaining adapter 9, and by tightening the bonnet 3, the second outer peripheral portion 8B1 and first outer peripheral portion 8A1 are compressed and held by the retaining adapter 9 and the valve device body 2. The second intermediate portion 8B2 has an arc-shaped cross-section when cut on a plane that includes the axis thereof, and a lower surface thereof contacts the first intermediate portion 8A2. Further, the second intermediate portion 8B2 is configured such that the radial direction length thereof is shorter than that of the first intermediate portion 8A2.

The second inner peripheral portion 8B3 curves from the inner end of the second intermediate portion 8B2 so as to separate from the main diaphragm 8A and extend toward the second step portion 6J of the valve body holder 6A. The second inner peripheral portion 8B3 contacts the lower surface 7C of the retaining ring 7. In other words, a second terminal end portion 8F on the inner peripheral side of the support diaphragm 8B is separated from the first terminal end portion 8E on the inner peripheral side of the main diaphragm 8A. Note that the support diaphragm 8B may contact the main diaphragm 8A while exerting pressing force thereon by configuring the second inner peripheral portion 8B3 to receive pressing force from the retaining ring 7. Further, a second penetrating hole 8d that is penetrated by the penetrating portion 6D of the valve body holder 6A is formed in a central portion of the support diaphragm 8B by an inner end of the second inner peripheral portion 8B3.

The handle 10 is attached to an upper end of the stem 4, and when an operator rotates the handle 10 manually so as to generate driving force, the stem 4 receives the rotary driving force so as to rotate while moving in the up-down direction. A through hole 10a is formed in the handle 10.

The indicator 11 is fixed to an upper end of the bonnet 3. The words "Open" and "Closed" are printed on an upper surface of the indicator 11. When the handle 10 is rotated such that the valve device 1 is in the open state, the word "Open" is visible through the through hole 10a in the handle 10, and when the valve device 1 is in the closed state, the word "Closed" is visible through the through hole 10a in the handle 10.

In the valve device 1 of this embodiment, when the stem 4 moves up and down in response to a rotation operation of the handle 10, the valve body portion 6 moves up and down, the first inner peripheral portion 8A3 of the main diaphragm 8A and the second inner peripheral portion 8B3 of the support diaphragm 8B move up and down together therewith, the diaphragm 8 undergoes elastic deformation such that the valve body 6B contacts and separates from the valve seat 2d, and as a result, the inflow passage 2b and the outflow passage 2c are opened and closed.

According to the valve device 1 of this embodiment, the diaphragm 8 includes the main diaphragm 8A and the support diaphragm 8B, which is positioned on the opposite side of the main diaphragm 8A to the valve chamber 2a side and provided in contact with the main diaphragm 8A. The first terminal end portion 8E on the inner peripheral side of the main diaphragm 8A is fixed to the valve body portion 6, the second terminal end portion 8F on the inner peripheral side of the support diaphragm 8B is separated from the first terminal end portion 8E on the inner peripheral side of the main diaphragm 8A, and the main diaphragm 8A and the support diaphragm 8B are formed from different materials.

According to this configuration, the diaphragm 8 is constituted by the main diaphragm 8A and the support diaphragm 8B. Hence, thickness is secured in the diaphragm 8 so that pressure resistance to the pressure of the fluid is maintained. Further, in each of the diaphragms 8A, 8B, a difference in the amount of deformation thereof due to a curvature difference between the upper and lower surfaces can be reduced, and therefore the load exerted on the diaphragm 8 during displacement of the diaphragm 8 can be reduced. Furthermore, the support diaphragm 8B, which moves in synchronization with the main diaphragm 8A, supports the main diaphragm 8A at all times, regardless of the open/closed state of the valve. As a result, the durability of the diaphragm 8 can be improved.

Moreover, by employing a material exhibiting superior corrosion resistance to the process gas and so on for the main diaphragm 8A, and for the support diaphragm 8B, which does not contact the process gas and so on, meaning that corrosion resistance need not be taken into account, employing a superior material that is capable of suppressing deformation of the main diaphragm 8A due to internal pressure exerted thereon by the fluid, the durability of the diaphragm 8 can be improved. The support diaphragm 8B is provided in contact with the main diaphragm 8A, while the second terminal end portion 8F on the inner peripheral side of the support diaphragm 8B is separated from the first terminal end portion 8E on the inner peripheral side of the main diaphragm 8A. Hence, even when the main diaphragm 8A and the support diaphragm 8B deform by different amounts during displacement due to the curvature difference between the upper and lower surfaces thereof, the first terminal end portion 8E and the second terminal end portion 8F are not fixed in the same location, and therefore the support diaphragm 8B deforms so as to follow the deformation of the main diaphragm 8A. Thus, formation of a gap between the main diaphragm 8A and the support diaphragm 8B can be suppressed, thereby ensuring that the support diaphragm 8B supports the main diaphragm 8A, and as a result, the pressure resistance and durability of the diaphragm 8 can be improved. It is therefore possible to provide a valve device 1 exhibiting superior pressure resistance, corrosion resistance, and durability.

Further, the lower surface 7C of the retaining ring 7 provided on the valve body portion 6 contacts the second inner peripheral portion 8B3 (the inner peripheral portion) of the support diaphragm 8B, and therefore the support diaphragm 8B can be prevented from separating from the main diaphragm 8A such that a gap is formed between the main diaphragm 8A and the support diaphragm 8B. As a result, deformation of the main diaphragm 8A due to the internal pressure of the fluid can be suppressed by the support diaphragm 8B.

Furthermore, the second outer peripheral portion 8B1 contacts the first outer peripheral portion 8A1, the second intermediate portion 8B2 contacts the first intermediate portion 8A2, the first inner peripheral portion 8A3 is configured to curve away from the inner end of the first intermediate portion 8A2 toward the valve seat 2d, and the second inner peripheral portion 8B3 is separated from the main diaphragm 8A. According to this configuration, the support diaphragm 8B can deform so as to follow the deformation of the main diaphragm 8A. Thus, deformation of the main diaphragm 8A due to the internal pressure of the fluid can be suppressed by the support diaphragm 8B, and as a result, the durability of the diaphragm 8 can be improved.

Moreover, the main diaphragm 8A is formed from a metallic material while the support diaphragm 8B is formed from rubber or a resin material, and the first terminal end portion 8E on the inner peripheral side of the main diaphragm 8A is fixed to the valve body portion 6 by welding. According to this configuration, the durability of the diaphragm 8 can be improved, whereby a valve device 1 exhibiting superior durability can be provided.

A valve device 21 according to a second embodiment of the present disclosure will now be described with reference to the drawings.

Figure 3:
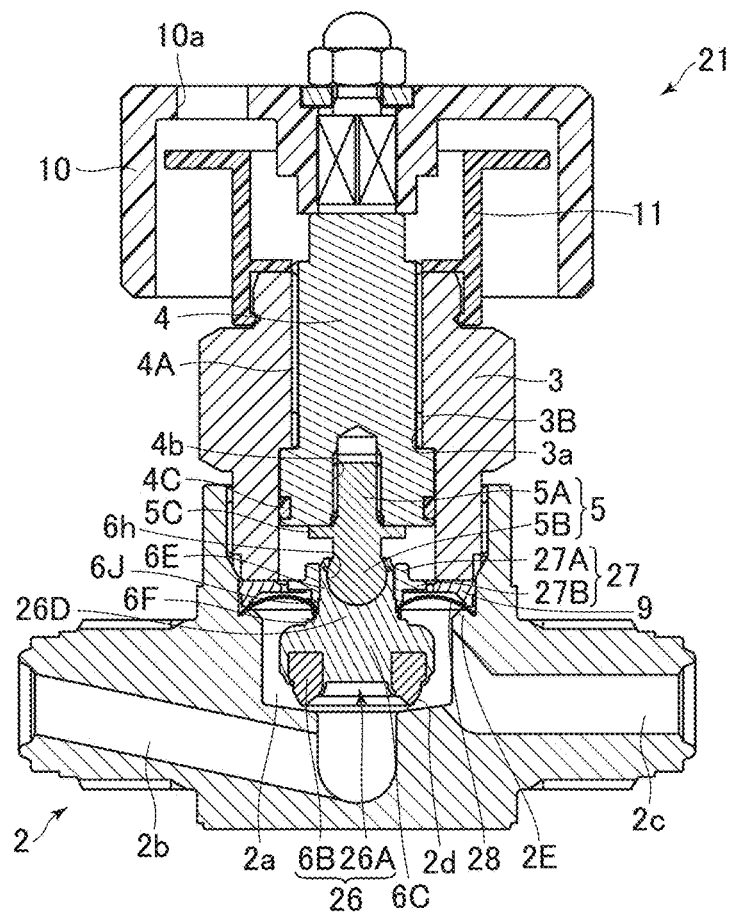
FIG. 3 illustrates a longitudinal cross-sectional view of a valve device in an open state according to a second embodiment.
Figure 4:
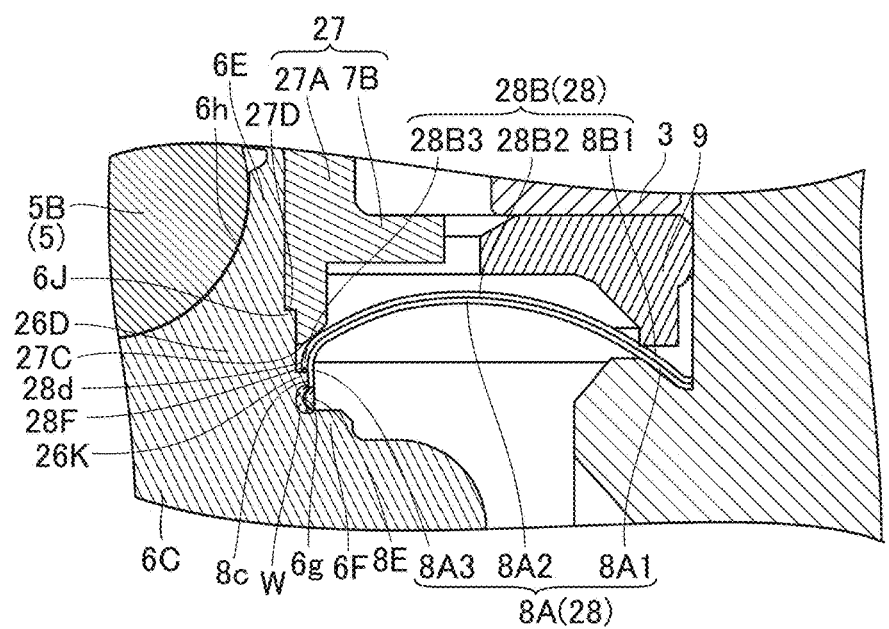
FIG. 4 illustrates an enlarged cross-sectional view of the vicinity of a diaphragm of the valve device according to the second embodiment.

FIG. 3 illustrates a longitudinal cross-sectional view of the valve device 21 according to the second embodiment in an open state. FIG. 4 illustrates an enlarged cross-sectional view of the vicinity of a diaphragm 28 of the valve device 21. Note that identical members to those of the valve device 1 of the first embodiment have been allocated identical reference numerals, and description thereof has been omitted, while parts that differ are described.

A third step portion 26K is formed on a penetrating portion 26D of a valve body holder 26A of a valve body portion 26.

A fourth step portion 27D that contacts the second step portion 6J is formed on an inner peripheral side of a cylindrical portion 27A of a retaining ring 27. Further, a lower surface 27C of the cylindrical portion 27A has a curved surface shape.

A second intermediate portion 28B2 of a support diaphragm 28B of a diaphragm 28 is configured such that the radial direction length thereof is equal to the first intermediate portion 8A2. A second inner peripheral portion 28B3 of the support diaphragm 28B is formed to curve downward from an inner end of the second intermediate portion 28B2, and contacts only an upper side part of the first inner peripheral portion 8A3. Hence, a second terminal end portion 28F on the inner peripheral side of the support diaphragm 28B is separated from the first terminal end portion 8E on the inner peripheral side of the main diaphragm 8A. Furthermore, a second penetrating hole 28d that is penetrated by the penetrating portion 26D of the valve body holder 26A is formed in a central portion of the support diaphragm 28B by an inner end of the second inner peripheral portion 28B3. The lower surface 27C of the cylindrical portion 27A contacts a boundary part between the second intermediate portion 28B2 and the second inner peripheral portion 28B3, the boundary part corresponding to an inside portion of the support diaphragm 28B.

Likewise in the valve device 21 of this embodiment, the durability of the diaphragm 28 can be improved in a similar manner to the valve device 1 of the first embodiment, and as a result, a valve device 21 exhibiting superior durability can be provided.

The present disclosure is not limited to the above-described embodiments. Those skilled in the art can made various additions, changes, and the like within the scope of the present disclosure.

For example, in the above-described embodiments, the manually operated handle 10 is used as driving means for moving the stem 4 up and down, but automatic driving means may be used instead. Hydraulic driving means may be employed as the automatic driving means. Similar effects to those of the valve devices 1 and 21 of the above-described embodiments are achieved with a valve device having this configuration.

Further, the main diaphragm 8A and the support diaphragm 8B, 28B are each provided singly but may be provided in a plurality.

What is claimed is:

1. A valve device comprising:
   a valve device body that has a fluid passage and a valve chamber formed therein and includes a valve seat;
   a diaphragm that is provided to cover the valve chamber and keeps the valve chamber airtight;
   a stem that is configured to move to approach and separate from the valve seat; and
   a valve body portion that is inserted into a central portion of the diaphragm and connected to the stem, and that is configured to open and close the fluid passage by approaching the valve seat and separating from the valve seat, wherein
   the diaphragm includes a main diaphragm, and a support diaphragm positioned on an opposite side of the main diaphragm to the valve chamber side and provided in contact with the main diaphragm,
   a first terminal end portion on an inner peripheral side of the main diaphragm is fixed to the valve body portion, and
   a second terminal end portion on an inner peripheral side of the support diaphragm is separated from the first terminal end portion on the inner peripheral side of the main diaphragm,
   wherein a retaining ring is provided on the valve body portion on the opposite side of the diaphragm to the valve chamber side,
   a lower surface of the retaining ring contacts an inside portion of the support diaphragm,
   the main diaphragm includes a first outer peripheral portion, a first intermediate portion, and a first inner peripheral portion,
   the support diaphragm includes a second outer peripheral portion, a second intermediate portion, and a second inner peripheral portion, and
   the second outer peripheral portion contacts the first outer peripheral portion, the second intermediate portion contacts the first intermediate portion, the first inner peripheral portion is configured to curve away from an inner end of the first intermediate portion toward the valve seat, and the second inner peripheral portion is separated from the main diaphragm.

2. The valve device according to claim 1, wherein the main diaphragm is formed from a metallic material while the support diaphragm is formed from rubber or a resin material, and
the first terminal end portion on the inner peripheral side of the main diaphragm is fixed to the valve body portion by welding.

* * * * *